United States Patent
Daniels

(10) Patent No.: US 6,711,095 B1
(45) Date of Patent: Mar. 23, 2004

(54) EXPENABLE/RECOVERABLE VOICE AND DATA COMMUNICATIONS SYSTEM BUOY

(75) Inventor: Danny Daniels, Panama City, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/351,754

(22) Filed: Jan. 21, 2003

(51) Int. Cl.$^7$ ................................................ H04B 1/59
(52) U.S. Cl. ............................ 367/134; 367/2; 367/3
(58) Field of Search .......................... 367/134, 2, 3

(56) References Cited

U.S. PATENT DOCUMENTS

| | | | |
|---|---|---|---|
| 3,230,500 A | * | 1/1966 | Dunn ........................ 367/134 |
| 4,203,160 A | * | 5/1980 | Doherty ..................... 367/134 |
| 4,951,263 A | * | 8/1990 | Shope ........................ 367/134 |

FOREIGN PATENT DOCUMENTS

| | | | |
|---|---|---|---|
| CA | 1179056 A | * | 12/1984 |
| FR | 2721157 A | * | 12/1995 |
| GB | 2247379 A | * | 2/1992 |

OTHER PUBLICATIONS

Rivera, D.F.;Submarine towed communication antennas: past, present and future; Antennas and Propagation Society International Symposium, 2001. IEEE, Vol.: 2 , Jul. 8–13, 2001; pp. 426 –429 vol.2.*

Davis, J.; Dinger, R.; Goldstein, J.; Development of a superconducting ELF receiving antenna; Antennas and Propagation, IEE Transactions on [legacy, pre—1988], Vol.: 25 Issue: 2 , Mar. 1977; pp. 223 –231.*

Ishida, M.; Okamoto, Y.; Ocean microwave communication system; OCEANS , Vol.: 5 , Sep. 1973; pp. 400 –404.*

* cited by examiner

*Primary Examiner*—Daniel T. Pihulic
(74) *Attorney, Agent, or Firm*—Donald G. Peck; Harvey A. Gilbert

(57) ABSTRACT

An untethered communications buoy system has an untethered buoy freely floating on the surface of water to not compromise the location of the submersible. The submersible has a cavity containing a first data interface member connected to a computer/data-storage that is connected to an acoustic transducer. The untethered buoy has a computer/memory module connected to a radio transceiver and acoustic transceiver. A second data interface member is connected to the computer/memory module and is mounted on the untethered buoy for fitting into the cavity and mating with the first data interface member. A ship is remotely located from the submersible and buoy and has a radio transceiver and an acoustic transceiver. Mating the first and second data interface members permits bidirectional downloading of data between the computer/data-storage and the computer/memory module.

14 Claims, 2 Drawing Sheets

EXPENABLE/RECOVERABLE VOICE AND DATA COMMUNICATIONS SYSTEM BUOY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to communications links. More particularly, this invention is to an untethered buoy carrying radio and acoustic transceivers for communications between surface and submerged assets that does not compromise the location of the data sources.

Currently, voice communications between a submerged asset such as a submarine, and surface assets such as ships or shore-based stations, are limited in range due to the inherent losses of acoustic transmissions through the water medium. If a radio buoy is used, it is connected to the submerged asset by an active electronic conductor or optical fiber tether. The transmission of gathered data from submerged sensor assets is not always implemented but is a desired capability that would also require an active tether. A tethered buoy reveals the presence and approximate position of the submerged asset. A tethered buoy also encumbers the asset, restricts its movement, and requires that the asset be equipped to deploy and recover the buoy.

Thus, in accordance with this inventive concept, a need has been recognized in the state of the art for an untethered communications buoy system for long-range, high-speed electromagnetic and acoustic transmission of data between submersibles and surface ships without compromising location of either.

OBJECTS AND SUMMARY OF THE INVENTION

An object of the invention is to provide an untethered communications buoy system bidirectionally transmitting electromagnetic and acoustic data without compromising the location of data sources.

Another object is to provide an untethered communications buoy system for long-range, high-speed data transfer between manned or unmanned submerged assets and surface assets.

Another object of the invention is to provide an untethered communications buoy system for long-range, high-speed data transfer between submerged assets and surface assets.

Another object of the invention is to provide a buoy system for long-range, high-speed voice communications and/or exchange of digital data files between submerged assets and surface assets.

Another object of the invention is to provide an untethered buoy system using radio links for long-range, high-speed data transmission of acoustic data between submerged assets and surface assets.

Another object of the invention is to provide a buoy system transmitting acoustic data over a radio communications link located remotely from its submerged source.

Another object of the invention is to provide a buoy system minimizing the risk of detection and compromise of the submerged asset while the data gathered during the mission is passed to the fleet.

These and other objects of the invention will become more readily apparent from the ensuing specification when taken in conjunction with the appended claims.

Accordingly, the present invention is to an untethered communications buoy system having an untethered buoy freely floating on the surface of water so as not to compromise the location of a submersible. The submersible has a cavity containing a first data interface member connected to a computer/data-storage that is connected to an acoustic transducer. The untethered buoy has a computer/memory module connected to a radio transceiver and acoustic transceiver. A second data interface member is connected to the computer/memory module and is mounted on a rim of the untethered buoy for fitting into the cavity and mating with the first data interface member. A ship is remotely located from the submersible and buoy and has a radio transceiver and an acoustic transceiver. Mating the first and second data interface members permits bidirectional downloading of data between the computer/data-storage and the computer/memory module.

DESCRIPTION OF THE PREFERRED EMBODIMENTS

Figure 1:
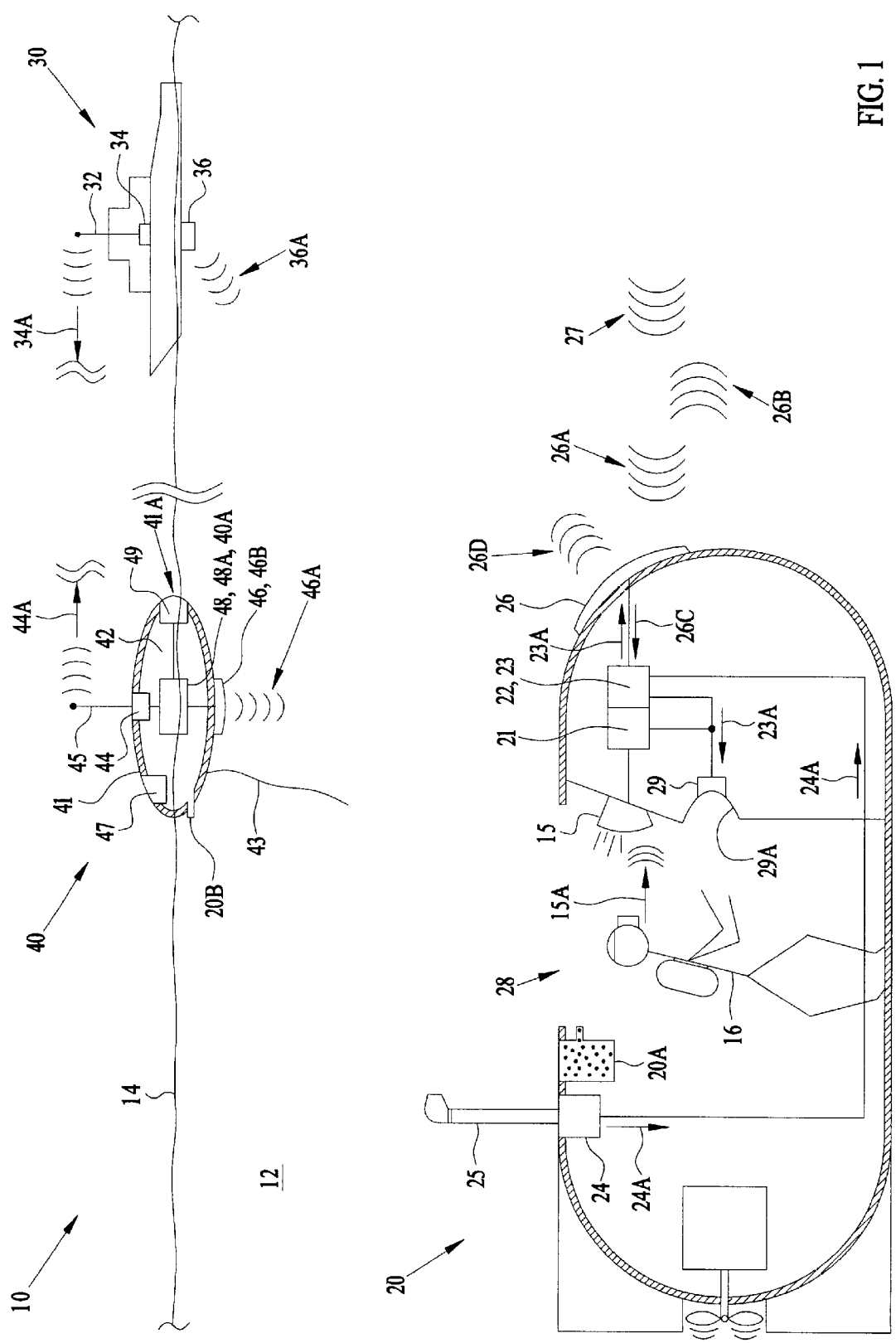
FIG. 1 is a schematic representation of the communications system of the invention having an untethered buoy for an acoustic link and a radio link between a submersible and surface ships to assure real-time voice/digital data communications.

Referring to FIG. 1, communications system 10 of the invention transmits real-time, two-way voice and/or digital data communications between a submerged asset 20 and a distant surface asset 30 of the fleet. Communications system 10 has an untethered buoy 40 to reduce the risk of detection and/or compromise of submerged asset 20 while the data gathered for a mission is transmitted to surface asset 30 without delay.

Submerged asset 20 can be a compact, manned swimmer delivery vehicle, flooded as depicted, or a larger, full-size submarine or other manned or unmanned submersible, remotely deployed sensor array, or transponder of data that is deployed in bodies of water 12, such as an ocean. Submerged asset (hereinafter referred to as submersible) 20 can be deployed for unattended, attended, autonomous, or manned operation. A computer 21 having data storage 22 onboard submersible 20 can store data 23 from a wide variety of sources. These data sources include but are not limited to: 1.) video data signals shown as arrow 24A from video camera 24 on periscope 25, 2.) voice communication data signals, shown as arrow 15A from an underwater microphone/speaker 15 near on-board diver/operator 16, 3.) acoustic data signals 26A reflected from objects (not shown) and received at acoustic transducer 26 from acoustic signals 26B projected from acoustic transducer 26, and 4.) acoustic data signals 27 relayed or transmitted from distant hydrographic or tactical data sources (not shown). Submersible 20 can remain submerged and on-station during extended missions in the hostile undersea environment.

Surface asset 30 can be one or more distant ships of the fleet or shore-based installations each having a radio antenna 32 connected to a radio transceiver 34. Each radio transceiver 34 can transmit electromagnetic signals shown as arrow 34A that could represent commands and other data, and each radio transceiver 34 can receive distantly originating electromagnetic data signals. Surface asset (hereinafter referred to as ship) 30 does not reveal its position when operating in the passive, receive-mode. This enables it to initiate responsive action including transmission of electromagnetic signals 34A without being exposed to the dangers associated with being at the location of submersible 20. Ship 30 additionally has an acoustic transceiver 36 transmitting acoustic signals 36A that could be commands or other information, and each acoustic transceiver 36 can receive distantly originating acoustic data signals.

Buoy 40 is intended to be expendable but under some conditions, it may be recovered for later use. Buoy 40 can be carried inside of or extends across an access hatch 28 of submersible 20 as it is transported to where it will be deployed. To deploy buoy 40, a source of compressed gas 20A in submersible 20 is connected to a one-way fitting 20B in flexible outer wall, or hull 41 of buoy 40 to inflate and extend hull 41 to a rigid saucer shape containing a sealed interior 42. Compressed gas source 20A can be pressurized gas tanks or scuba tanks onboard for diver/operator 16. Inflated buoy 40 is positively buoyant, and when released, or launched from submersible 20, it freely floats to surface 14 of water 12. Buoy 40 is not tethered to submersible 20 so that wind and ocean currents can carry buoy 40 away and separate it from submersible 20.

In some operational scenarios, a passive lanyard 43 can extend between submersible 20 and buoy 40 to help control the launch and to retrieve buoy 40 when direct transfer of data between buoy 40 and submersible 20 is called for. When lanyard 43 is attached, however, it may be severed soon after its period of usefulness has finished preventing compromise of the location of submersible 20.

Buoy 40 has a radio transceiver 44 connected to a radio antenna 45 extending above hull 41 for a radio communications link, and an acoustic transceiver 46 extending below hull 41 for an acoustic communications link. A battery power source 40A and computer/memory module 48 for stored data 48A is connected to radio transceiver 44 and acoustic transceiver 46, and computer/memory module 48 is connected to a male data interface member 49 on rim portion 41A at one side of hull 41. Noting FIG. 2, male data interface member 49 on rim portion 41A can engage mating female data interface member 29 in a correspondingly shaped cavity 29A in submersible 20 when operator 16 fits rim portion 41A into correspondingly shaped cavity 29A to bidirectionally download data between computer/data-storage 21, 22 in submersible 20 and computer/memory module 48 in buoy 40. Mating data interface member 49 on rim portion 41A and data interface member 29 in correspondingly shaped cavity 29A can be any of a number of known data connectors capable of transmitting signals underwater. The shapes of rim portion 41A and correspondingly shaped cavity 29A help guide and assure engagement of mating male and female data interface members 29, 49 in the sometimes confining inside of submersible 20 and under low light conditions. Data interface members 29, 49 could be optical connector elements that conduct optical data between them when brought within a predetermined special disposition. In this case computer/memory module 48 in buoy 40 and computer/data-storage 21, 22 in submersible 20 would have suitable optical data converters to convert the data to and from optical form.

Figure 2:
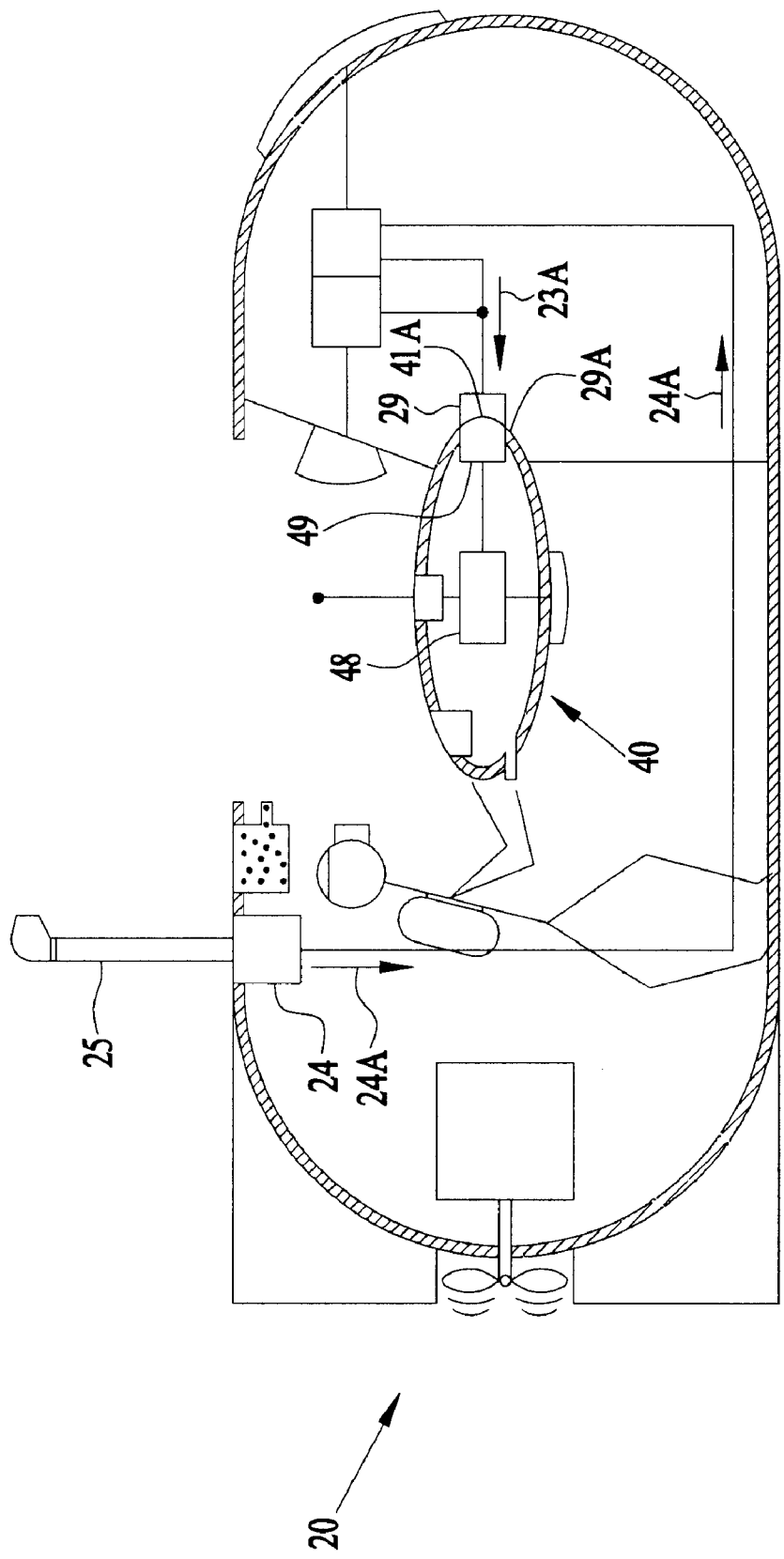
FIG. 2 is a schematic representation showing loading of data from a submersible onto an untethered buoy.

This downloading of data shown as arrow 23A of data 23 in data storage 22 of submersible 20 can occur when operator 26 fits data interface members 29, 49 together and initiates downloading of data 23 from computer/data-storage 21, 22 of submersible 20 to computer/memory module 48 of buoy 40, see FIG. 2. This downloading process can be reversed when computer/memory module 48 in buoy 40 has stored data 48A downloaded into computer/data-storage 21, 22 of submersible 20 via data interface members 29, 49. Stored data 48A in computer/memory module 48 can be, for example, of electromagnetic signals 34A transmitted from radio transceiver/antenna 34, 35 on ship 30 to radio transceiver/antenna 44, 45 on buoy 40 or acoustic data signals 36A transmitted from acoustic transducer 36 on ship 30 to acoustic transceiver 46 on buoy 40.

Acoustic transceiver 46 on buoy 40 also can be used to download stored data 48A from buoy 40 by transmitting stored data 48A as projected acoustic data signals 46A to acoustic transducer 26 on submersible 20. Acoustic data signals 46A from buoy 40 are received by acoustic transducer 26 that generates responsive data signals shown as arrow 26C that are coupled to computer/data-storage 21, 22 as data signals 23 to effect an acoustic downloading of data 48A from buoy 40 to submersible 20. This acoustic downloading process can be reversed by acoustically sending data signals 23A from computer/data-storage 21, 22 in submersible 20 as projected data signals 26D from transducer 26, and acoustic transceiver 46 in buoy 40 receives data signals 26D and generates responsive data signals 46B that are coupled to computer/memory 48 as data signals 48A to effect an acoustic downloading of data 23A from submersible 20 to buoy 40.

Either of acoustic transceiver 46 or transducer 26 can transmit acoustic data signals 46A or data signals 26D from buoy 40 or submersible 20 at low power to acoustic transceiver 36 of ship 30 when it is in range to receive such acoustic transmissions. It may be advantageous however to send acoustic data signals 26D at low power to buoy 40 to avoid detection, and then acoustic transceiver 46 on buoy 40 can transmit acoustic data signals 46A at higher levels of power to ship 30 to assure reliable transmission. Sending higher power acoustic signals 46A from buoy 40 will not give away the position of submersible 20 and could be a more covert way of sending the information when eavesdropping of electromagnetic signals is know to be more likely.

Buoy 40 can start transmitting data as electromagnetic signals shown as arrow 44A to ship 30 as soon as buoy 40 reaches surface 14. Optionally, buoy 40 can float on surface 14 until acoustic transmit command signal 26D or 36A sent from submersible 20 or ship 30 is received by acoustic transceiver 46 or electromagnetic transmit command signal 34A sent from ship 30 is received by radio antenna 45. Any combination of transmit protocols is possible such as: transmit when commanded, transmit until commanded to stop, transmit once unless commanded to repeat, etc.

Computer/memory module 48 in buoy 40 also could be commanded or preprogrammed for detonating an explosive charge 47 to destroy or blow a hole in flexible wall 41 or otherwise scuttle and sink buoy 40. Detonation of charge 47 could be in response to remotely originating electromagnetic or acoustic command signals or in response to any chosen basis such as time at the surface, life of battery power source 40A remaining, sunrise, or other hydrographical and/or tactical data.

Long messages consisting of a great number of acoustic data signals or data signals of high information content can also be passed from submersible 20 to ship 30 over the acoustic link that includes acoustic transceiver 36, water 12 and acoustic transducer 26. But if the time required to complete the long message transmissions is not available or practicable, buoy 40 could be retrieved by lanyard 43 (assuming in this scenario that buoy 40 remains tethered by passive lanyard 43 to submersible 20). The high information content signals are downloaded to buoy 40 and stored as described above, and buoy is released to float on surface 14. Radio transceiver 44 quickly transmits electromagnetic signals 44A having the information content of the high information content data signals to ship 30 and a short acoustic signal 46A from acoustic transceiver 46 notifies operator 16 of submersible 30 via acoustic transceiver 26 that the radio transmission to ship 30 was complete. Submersible 20 can retrieve buoy 40 to reestablish the connection between mating data interface members 29, 49, and any data received from ship 30 in the form of electromagnetic signals 34A or acoustic signals 36A can be utilized by operator/diver 16. Buoy 40 can be deflated and retained for reuse.

Having buoy 40 of communications system 10 of the invention untethered eliminates the encumbrance otherwise created by an active. tether (electronic or optical) over which data has been transmitted between a submerged vessel and a relay buoy. The complications that the deployment and recovery of such an active tether and buoy entail also are avoided. Buoy 40 of the invention can still be recovered by way of passive tether 43 if the risk is acceptable.

Buoy 40 can be released to float and freely drift on surface 14 as submersible 20 proceeds on its way out of the release area before the transmission of data begins. The risk of detection and compromise of submersible 20 is thus minimized while data gathered during the mission is passed to the fleet without delay. Both manned and unmanned submersibles 20 could incorporate the features of this invention to employ this capability and benefit from its advantages.

Having the teachings of this invention in mind, modifications and alternate embodiments of communications system 10 may be adapted without departing from the scope of the invention. Communication system 10 of the invention provides real-time voice communications and the exchange of digital data files that are too large for acoustic transmission between a submersible 20 and ship 30 while not compromising the submersible's location. Communication system 10 of the invention does not limit the range of voice and data communications between a submersible and surface ship that might be otherwise lost due to attenuations inherent in acoustic transmissions.

The disclosed components and their arrangements as disclosed herein, all contribute to the novel features of this invention. Communications system 10 assures reliable data transfer and does not create undue danger for those gathering data from the marine environment irrespective of ambient conditions. Therefore, communications system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. A communications system comprising:
    a submersible in water having a cavity containing a first data interface member connected to computer/data-storage for data and an acoustic transducer connected to said computer/data-storage;
    an untethered buoy having a computer/memory module connected to a radio transceiver and acoustic transceiver and having a second data interface member connected to said computer/memory module and mounted on said untethered buoy for fitting into said cavity and mating with said first data interface member; and
    a ship remotely located from said submersible and buoy having a radio transceiver and an acoustic transceiver.

2. The communications system of claim 1 wherein mating said first data interface member and said second data interface member permits bidirectional downloading of data between said computer/data-storage and said computer/memory module.

3. The communications system of claim 2 wherein said radio transceiver and acoustic transceiver permit transmitting downloaded data from said submersible to said ship.

4. The communications system of claim 3 wherein said radio transceiver and acoustic transceiver permit receiving data from said ship for downloading from said ship and buoy to said submersible.

5. The communications system of claim 4 wherein said untethered buoy is deployed from said submersible for freely floating on the surface of said water.

6. The communications system of claim 5 further comprising:
    a video camera connected to a periscope on said submersible for creating video data signals, said video data signals being coupled to said computer/data-storage.

7. The communications system of claim 6 further comprising:
    an underwater microphone/speaker providing a source of voice data signals between an on-board diver/operator in said submersible and said computer/data-storage, said voice data signals being coupled to said computer/data-storage.

8. The communications system of claim 7 wherein said data of said computer/data-storage includes acoustic data signals reflected from objects and received at said acoustic transducer from acoustic signals projected from said acoustic transducer.

9. The communications system of claim 8 wherein said data of said computer/data-interface includes acoustic data signals from distant hydrographic and tactical data sources.

10. The communication system of claim 9 wherein said data interface members are optical connector elements connecting optical data, and said computer/memory module in said buoy and said computer/data-storage in said submersible have suitable optical data converters to convert the data to and from optical form.

11. The communication system of claim 9 further comprising:
    an explosive charge in said buoy for scuttling said buoy.

12. The communications system of claim 11 wherein scuttling of said buoy is in response to remotely originating command signals.

13. The communications system of claim 12 wherein scuttling of said buoy is in response to chosen hydrographical and tactical events including time at the surface, life of battery power source remaining, and sunrise.

14. The communication system of claim 9 further comprising:
    a passive lanyard extending between said submersible and said buoy for controlling launch and retrieval of said buoy and to permit direct transfer of data between said buoy and said submersible.

* * * * *